United States Patent
Grant

[15] 3,698,737
[45] Oct. 17, 1972

[54] VEHICLE SUSPENSION
[72] Inventor: Lewis F. Grant, Battle Creek, Mich.
[73] Assignee: Clark Equipment Company
[22] Filed: Nov. 12, 1970
[21] Appl. No.: 88,749

[52] U.S. Cl. .................................. 280/112 R, 267/46
[51] Int. Cl. ............................................. B60g 11/02
[58] Field of Search .............. 280/124 A, 112; 267/46

[56] References Cited

UNITED STATES PATENTS 3,554,576  2/1968  Parker .................. 280/112 R
3,243,198  3/1966  Simovich ............... 280/112 R

*Primary Examiner*—Philip Goodman
*Attorney*—Kenneth C. Witt, John C. Wiessler, Robert H. Johnson and Lewis J. Lamm

[57] ABSTRACT

A vehicular spring suspension which includes a frame supported trunnion mounted support arm extending transversely of the vehicle and connected at its opposite ends to the one ends of a pair of parallel longitudinally extending leaf springs from which are supported an axle and wheels. The mounting for the support arm includes a spherical bearing mounted on a trunnion shaft of such length that the support arm is movable in three separate directions on the shaft, viz., in articulation in a vertical plane, in articulation in a transverse of longitudinal plane, and axially of the shaft, as well as in various combinations of said three directions of movement depending upon the nature or type of irregularity of the terrain in which the vehicle is operated.

9 Claims, 4 Drawing Figures

PATENTED OCT 17 1972    3,698,737

INVENTOR
LEWIS F. GRANT

BY J.P. Wienke

ATTORNEY

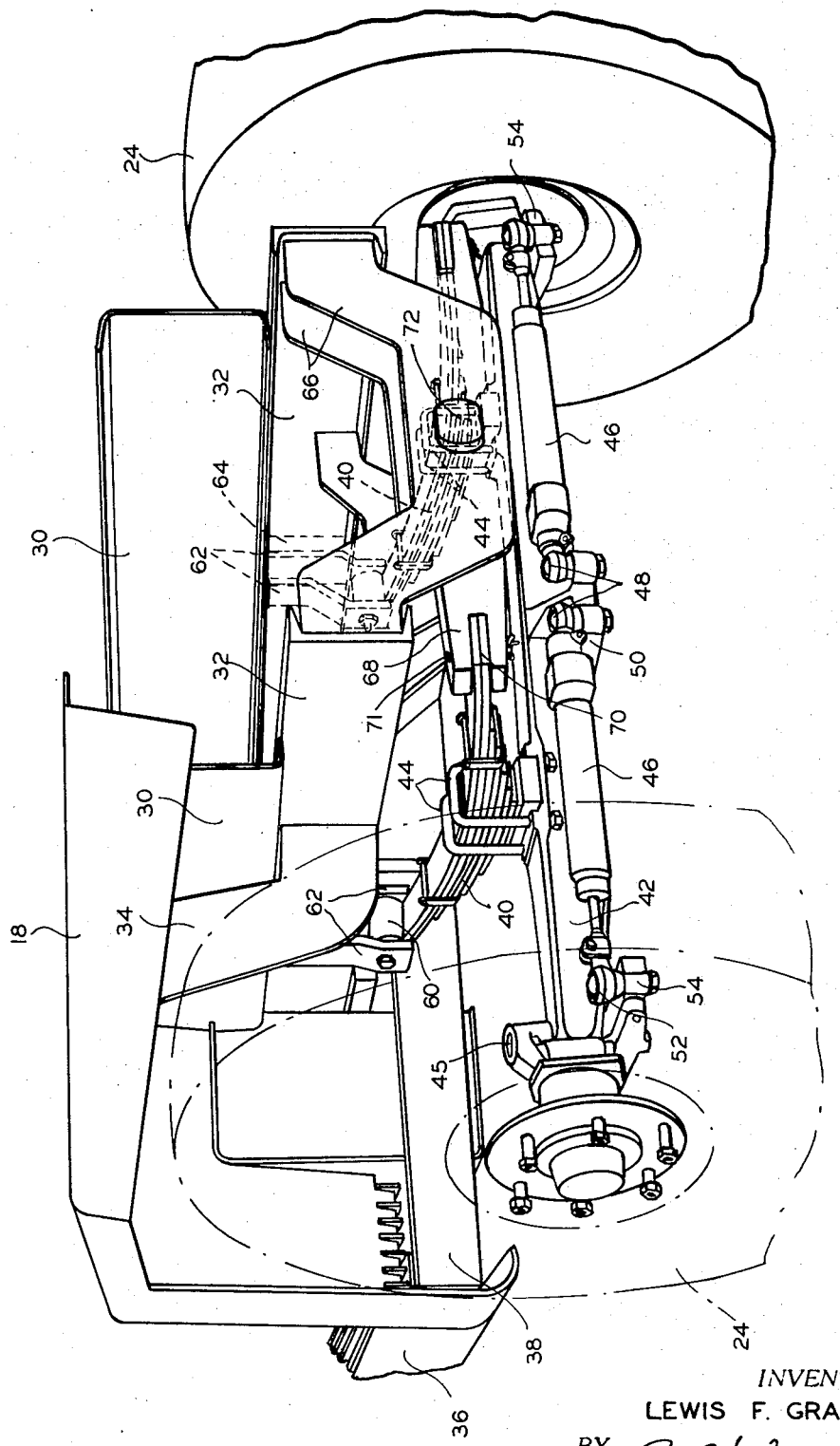

VEHICLE SUSPENSION

BACKGROUND OF THE INVENTION

The field of art to which the invention pertains includes vehicle suspensions.

Articulated spring supported vehicle axles of certain types are known in the art, such as of the type disclosed in U.S. Pat. No. 3,243,198. The patent discloses a spring suspension for lift truck type vehicles wherein the one ends of a pair of parallel leaf springs are mounted from a pair of pivoted links which are in turn mounted from opposite ends of an articulated trunnion arm which is supported from the vehicle frame on a trunnion shaft. The links and trunnion arm combine with a non-centered location of suspension of the wheels and axle from the leaf springs to permit articulation of the wheels and axle in a vertical plane and a twisting action of the leaf springs forwardly of the location of the axle mounting thereon so as to provide the claimed improved suspension construction. The suspension construction of the patent does enable rough terrain operation of the vehicle but in so doing it requires five separate pivotal connections in relation to the trunnion arm, viz., two pivot connections at each link and one at the trunnion shaft, which is undesirable, particularly in heavy duty applications.

SUMMARY

My invention comprises a substantial improvement over any known prior vehicle articulated sprung axle suspension. It provides an extremely rugged and novel structure of relatively low cost which requires only a single trunnion or pivot assembly which enables the vehicle wheel and axle assembly to articulate in both vertical and longitudinal planes, and to also move axially of the vehicle. Such an improved result has been accomplished in a construction which also provides a rigid connection between opposite ends of a supporting articulated arm and the respective ends of the springs. Substantial improvements in structural rigidity and ruggedness of design have been effected while, at the same time, reducing the cost of the structure and reducing maintenance requirements in comparison with relevant prior art.

It is therefore a primary object of the invention to provide an improved articulated spring suspension for vehicles.

Another important object is to provide an improved vehicle articulated spring suspension in which the wheel and axle assembly is movable in three different directions relative to the vehicle in a construction of rugged simplicity and relatively low cost and maintenance.

BRIEF DESCRIPTION OF THE DRAWING

FIG. 2 is an enlarged perspective view of the interior of the rear portion of the vehicle showing the suspension from the vehicle frame of the steer axle and wheels;

DESCRIPTION OF THE PREFERRED EMBODIMENT

Figure 1:
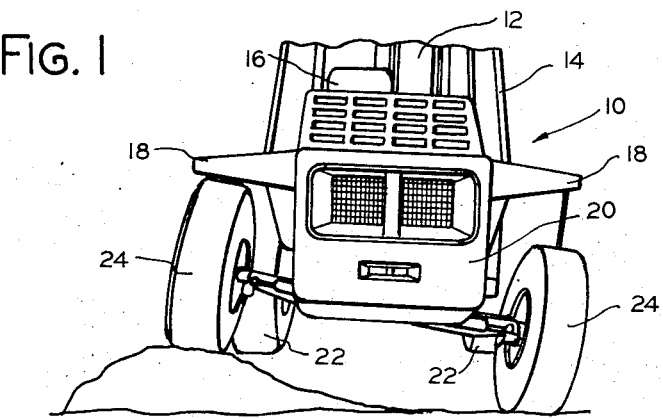
FIG. 1 is a perspective view taken from the rear showing a portion of a lift truck vehicle which embodies my invention traversing rough terrain.

Referring first to FIG. 1, a lift truck of known type is shown generally at numeral 10. It is of a type constructed for outdoor use in relatively rough terrain. A portion of the lifting mast is shown at 12 and a portion of the overhead guard and the operator's station at 14 and 16, respectively. Rear fenders of the machine are indicated at 18 and the counterweight portion which is supported from the main frame at 20, the front drive wheels being illustrated at 22 and the rear articulated steer wheels at 24.

Figure 3:
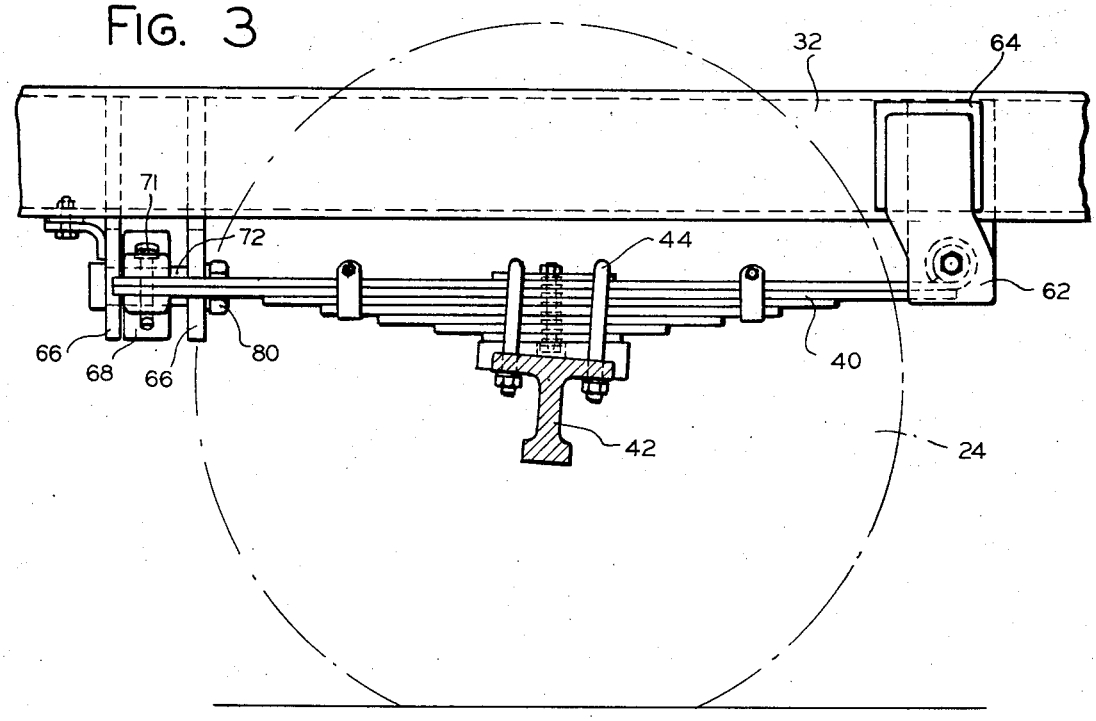
FIG. 3 is a side view in elevation taken from the right-hand side of FIG. 2 of a portion of the vehicle construction as shown in FIG. 2.
Figure 4:
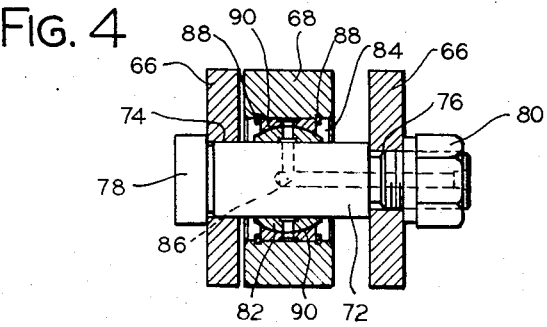
FIG. 4 is an enlarged view in section of a portion of FIG. 3 showing the articulated arm and trunnion mounting assembly.

Referring now to FIGS. 2–4, the rear portions of a pair of parallel longitudinally extending and inwardly opening main channel body support members are shown at numerals 30; they are supported by a pair of main frame longitudinal channels 32. A pair of brackets 34, one of which is shown, are secured to and extend outwardly and upwardly from the outer surfaces of channels 32 for supporting partially fenders 18 from which extend forwardly on each side an operator's step 36, one of which is partially shown. A transverse frame member 38 connects together the rear ends of steps 36.

A pair of transversely spaced and longitudinally extending leaf springs 40 are mounted from the frame of the truck for supporting a generally T-shaped steer axle 42 by means of conventional pairs of U-bolts 44, said steer axle having mounted in conventional manner at its opposite ends the pair of steer wheels 24 on king pins 45. A pair of oppositely extending hydraulic power steering actuators 46 are mounted from ball joints 48 on a bifurcated bracket 50 which is supported from steer axle 42, for actuating wheels 24 in a conventional manner through ball joints 52 and steering arms 54 about king pins 45. The forward end of each spring 40 is mounted from a shackle 60 located between a pair of downwardly extending fixed bars or brackets 62 which are secured in the pocket of a downwardly opening and outwardly extending short channel member 64 (FIG. 3) on each side of the vehicle, members 64 being secured to the outer sides of longitudinal channels 32.

A pair of longitudinally spaced and transversely extending generally U-shaped frame members 66 having end portions secured in the pockets of the rear ends of frame members 32 support therebetween a transversely extending articulated trunnion arm 68 which embraces in slotted portions 70 at its opposite ends the rear ends of leaf springs 40. Such that the springs can pivot on holding pins 71 in a transverse plane when the springs change in effective length one relation to the other. Arm 68 is mounted pivotally from a short trunnion shaft 72 extending through axially aligned openings 74 and 76 in members 66, the rear end having an enlarged head portion 78 secured thereto and the front end being threaded to receive a nut 80. A spherical bearing assembly 82 is mounted in an opening 84 centrally of arm 68 which is adapted to be lubricated by a lubrication channel 86 formed longitudinally and then transversely of the trunnion pin 72 into the spherical bearing assembly as illustrated. This enables both the outer surface of the trunnion pin 72 and the bearing to be lubricated. A pair of locking rings 88 cooperate with the opening in arm 68 to maintain the spherical bearing in position, which permits fore and aft twisting movement of arm 68 in a transverse plane on the spherical bearing surface as shown partially in section at numerals 90 in FIG. 4. A suitable bearing of the type contemplated is manufactured by Roller Bearing Company of America, Part No. B-28-L. It will be noted that the length of trunnion pin 72 between members 66 is substantially longer than is the thickness of trunnion arm 68, thereby permitting under certain conditions fore and aft sliding movement longitudinally of the truck of arm 68 on trunnion pin 72 from a full rearward position in contact or near contact with rear plate 66 to a full forward position in contact or near contact with front plate 66.

In operation in rough terrain it is well known that three dimensional movement in any one or combination of three directions or dimensions is essential in order to maintain full contact of the wheels with the ground or other surface being traversed by the vehicle, and, as described above, prior U.S. Pat. No. 3,243,198 discloses one means of accomplishing this desirable result. The present invention accomplishes a similar result by substantially different and much improved means by utilizing only a single centrally located trunnion assembly of the articulated rear wheel suspension. As the effective load carried by the rear wheel assembly increases, leaf springs 40 tend to flatten out as shown in FIG. 3 which, if the wheels are travelling on a flat surface, effects a substantially axial rearward movement of arm 68 on trunnion shaft 72 towards rear plate 66. As the said load decreases leaf springs 40 tend to bow out, as shown in FIG. 2, which tends to effect a forward axial movement of arm 68 on the trunnion shaft towards front plate 66. If the load is not uniform and results in a greater load being supported from one leaf spring 40 than from the other, trunnion arm 68 will tend to articulate in a substantially transverse or longitudinal plane, if the wheels are travelling on a horizontal surface, the more heavily loaded end of the trunnion arm moving rearwardly and the more lightly loaded end moving forwardly in relation to the location of the bearing on the trunnion shaft. If the vehicle is travelling in terrain which tends to raise one wheel above the other, the trunnion arm articulates in a substantially vertical plane to accommodate the raising and lowering of wheels 24 relative to each other.

It will be appreciated that my substantial improvement in vehicle suspension means of the type contemplated is capable of operation in rough terrain with a non-uniform load in relation to springs 40 to effect a variety of combinations of the three available movements of the trunnion arm 68, in relation to the trunnion shaft, viz., both longitudinal and vertical articulation, and axial movement of the trunnion arm on the trunnion shaft. As used herein the terms "transverse" "longitudinal' and "vertical" in relation to articulation of arm 68 should be understood to have reference to a particular set of vehicular operating conditions, the actual location of the plane or planes in which the trunnion arm articulates being widely variable as a function of the angular attitude of the vehicle in any particular terrain in which it may operate.

Although I have described and illustrated a preferred embodiment of my invention, it will be understood by those skilled in the art that modifications may be made in the structure, forms and relative arrangement of parts without necessarily departing from the spirit and scope of the invention. Accordingly, it should be understood that I intend to cover by the appended claims all such modifications which fall within the scope of my invention.

I claim:

1. In a vehicle having a frame, vehicle suspension means connected to a portion of said frame comprising a trunnion yoke mounted under the frame and extending transversely thereof, a pair of longitudinally spaced and transversely extending frame members, a longitudinally extending trunnion shaft supported from said frame members and supporting said trunnion yoke, and universal type bearing means mounting said trunnion yoke on said trunnion shaft such that said trunnion yoke is capable of a first arcuate movement in a vertical plane and a second arcuate movement in a plane generally longitudinal of the vehicle.

2. A vehicle suspension means as claimed in claim 1 wherein said trunnion shaft has an effective length between said frame members such that said trunnion yoke and universal bearing means is capable of limited movement on and axially of said trunnion shaft.

3. A vehicle suspension as claimed in claim 1 wherein a pair of spaced-apart leaf springs extend longitudinally of the frame, one end of each leaf spring being fastened to the respective end of the trunnion yoke and the other end thereof being connected to the frame at a position spaced longitudinally of the trunnion yoke, the latter connection to the frame preventing transverse pivotal movement of said other end of the spring relative to the frame, and a transversely extending axle and wheel assembly connected to the leaf springs intermediate the ends thereof.

4. In a vehicle having a frame, vehicle suspension means connected to a portion of said frame comprising a trunnion yoke mounted under the frame and extending transversely thereof, a pair of longitudinally spaced and transversely extending frame members, a trunnion shaft supported from said frame members and spherical bearing means mounting said trunnion yoke on said trunnion shaft such that said trunnion yoke is capable of pivotal movement on said trunnion shaft both in a vertical plane and in a plane generally longitudinal of the vehicle, as well as in combinations of such pivotal movements, all as a function of the nature of the terrain in which the vehicle is operated.

5. A vehicle suspension means as claimed in claim 4 wherein spaced-apart leaf springs extend longitudinally of the frame, one end of each leaf spring being connected to one end of the trunnion yoke and the other end thereof being connected to the frame at a position spaced longitudinal of the trunnion yoke, the connection at the frame preventing transverse pivotal movement of the other end of the spring relative to the frame, and a transversely extending axle and wheel assembly connected to the leaf springs intermediate the ends thereof.

6. A vehicle suspension means as claimed in claim 5 wherein said transverse frame members are of generally U-shaped configuration and support substantially centrally thereof said trunnion shaft, said one end of each leaf spring being connected to the respective end of said trunnion yoke for pivotal movement in said longitudinal plane.

7. A vehicle suspension means as claimed in claim 5 wherein said trunnion shaft has an effective length permitting limited movement of the trunnion yoke and bearing means in a direction axial of said trunnion shaft and as a function of the load on the leaf springs.

8. Vehicle suspension means as claimed in claim 7 wherein the load supported by one or both of said leaf springs and the terrain in which the vehicle is operated combine to effect various combinations of one or more of the said three independent available movements of said trunnion yoke longitudinal, vertically and axially of the vehicle.

9. A vehicle suspension means as claimed in claim 7 wherein axial movement of the trunnion yoke is effected by a change in the effective lengths of the leaf springs, vertical articulation of the trunnion yoke is effected by a change in elevation of one wheel in relation to the other, and longitudinal articulation is effected by a change in the effective length of one spring in relation to the other spring, said three trunnion yoke movements being combinable to effect resultant combined pivotal and axial movements of the trunnion yoke.

* * * * *